US008836296B2

(12) United States Patent
Iwabuki et al.

(10) Patent No.: US 8,836,296 B2
(45) Date of Patent: Sep. 16, 2014

(54) POWER CONVERSION APPARATUS (75) Inventors: Hiroyasu Iwabuki, Tokyo (JP); Hiroshi Kurushima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 13/821,253

(22) PCT Filed: Sep. 26, 2011

(86) PCT No.: PCT/JP2011/071870
§ 371 (c)(1),
(2), (4) Date: Mar. 7, 2013

(87) PCT Pub. No.: WO2012/043466
PCT Pub. Date: Apr. 5, 2012

(65) Prior Publication Data
US 2013/0170265 A1 Jul. 4, 2013

(30) Foreign Application Priority Data
Sep. 28, 2010 (JP) ................................. 2010-216491

(51) Int. Cl.
*G05F 1/00* (2006.01)
*H02M 1/42* (2007.01)
*H02M 7/06* (2006.01)
*H02M 7/217* (2006.01)
*H02M 1/00* (2006.01)

(52) U.S. Cl.
CPC .............. *H02M 7/06* (2013.01); *H02M 7/2176* (2013.01); *H02M 1/4216* (2013.01); *Y02B 70/126* (2013.01); *H02M 2001/0003* (2013.01); *H02M 1/4225* (2013.01)
USPC .......................................... 323/266; 323/283

(58) Field of Classification Search
USPC ......... 323/234, 237, 241, 265, 266, 282, 283; 363/59, 60, 61, 89, 123, 124, 125, 127
See application file for complete search history.

(56) References Cited

U.S. PATENT DOCUMENTS

| 5,867,379 A * | 2/1999 | Maksimovic et al. .......... 363/89 |
| 2006/0245219 A1* | 11/2006 | Li ................................... 363/89 |
| 2009/0016087 A1 | 1/2009 | Shimizu |
| 2011/0211375 A1* | 9/2011 | Uno ............................... 363/74 |

(Continued)

FOREIGN PATENT DOCUMENTS

| JP | 3 284168 | 12/1991 |
| JP | 6 36385 | 5/1994 |

(Continued)

OTHER PUBLICATIONS

International Search Report Issued Dec. 6, 2011 in PCT/JP11/71870 Filed Sep. 26, 2011.

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

A three-phase rectification circuit rectifies output voltage of a three-phase AC power supply, a step-up converter circuit steps up the output voltage, and a smoothing device smoothes the stepped-up output voltage. A voltage detection circuit detects output voltage $Vo_L$ of the smoothing device, and an AC current component detection circuit extracts AC component included in output current of the three-phase rectification circuit and outputs a detection signal $Vi_L$ corresponding to the AC component. A control circuit calculates a deviation $\Delta Vdc1$ (=$Vs-Vo_L-Vi_L$) among an output voltage instruction Vs for output voltage of the step-up converter circuit and detection signals $Vo_L$ and $Vi_L$ obtained by the detection circuits, and generates a pulse signal for suppressing the deviation $\Delta Vdc1$ to zero, thereby performing PWM control for a switching device of the step-up converter circuit.

6 Claims, 4 Drawing Sheets

(56) References Cited

U.S. PATENT DOCUMENTS

2005/0219872 A1* 10/2005 Lys ............................ 363/21.04
2006/0132104 A1* 6/2006 Li ................................ 323/207

FOREIGN PATENT DOCUMENTS

| | | | |
|---|---|---|---|
| JP | | 7 31150 | 1/1995 |
| JP | | 9 233821 | 9/1997 |
| JP | | 10 174443 | 6/1998 |
| JP | | 2869498 | 3/1999 |
| JP | | 2005 229792 | 8/2005 |
| JP | | 2006 271089 | 10/2006 |
| JP | | 2007 236034 | 9/2007 |
| JP | | 2009 38957 | 2/2009 |
| JP | | 2010 187521 | 8/2010 |

* cited by examiner

POWER CONVERSION APPARATUS

TECHNICAL FIELD

The present invention relates to a power conversion apparatus capable of converting three-phase AC power to DC power and improving an input power factor of a power supply.

BACKGROUND ART

In one conventional example of power conversion apparatuses that perform full-wave rectification for a three-phase AC power supply to output DC power, six rectification devices such as diodes are connected in series two by two, the anodes thereof are connected to each other, and the cathodes thereof are connected to each other, to form a bridge circuit which is used as a full-wave rectification circuit. A smoothing capacitor is provided on an output side of the full-wave rectification circuit. The respective phases of the three-phase AC power supply are supplied to the middle points of the above series connections.

However, in such a power conversion apparatus, since pulse current with a high peak flows on an output side of the three-phase AC power supply, power supply current includes many distortion components, that is, harmonic components, whereby the supply power factor decreases to 0.6 to 0.7. The decrease in the supply power factor results in increase in the size and the cost of the power conversion apparatus.

Accordingly, in order to improve the supply power factor of a three-phase AC power supply, a conventional technique disclosed in Patent Document 1 shown below proposes the following configuration. That is, AC reactors for the respective phases are provided between an AC power supply and a full-wave rectification circuit, and a converter is connected to the output side of the full-wave rectification circuit. Conduction intervals of the respective phases of current on the AC power supply side are prolonged by ON/OFF operation of a switching device of the converter and by the AC reactors provided on the AC side of the full-wave rectification circuit, and variation in the AC current is smoothed by the AC reactors on the power supply side. Thus, distortion components of current and voltage on the AC power supply side are decreased and the supply power factor is improved.

In addition, a conventional technique disclosed in Patent Document 2 shown below proposes the following configuration. That is, a single-phase rectification circuit and a converter circuit for improving power factor are connected to each phase output of the three phases, whereby each phase voltage of the three phases is individually rectified to make an input current waveform close to a sine wave, and power is supplied to a load with the supply power factor being increased to be close to 1 by the converter circuit for improving power factor.

Further, a conventional technique disclosed in Patent Document 3 shown below proposes the following configuration. That is, a step-up converter which steps up an output voltage of a three-phase rectification circuit is provided, the voltage of a smoothing device connected to the output of the step-up converter and the output current of the three-phase rectification circuit are detected, a DC current instruction for suppressing the deviation between a voltage instruction and the detected voltage value to zero is generated by a DC current instruction generation circuit, a pulse signal for suppressing the deviation between the DC current instruction and the detected current value to zero is generated by a pulse signal generation circuit, and the output current of the rectification circuit is converted to DC current through ON/OFF control for a switching device of the step-up converter by using the pulse signal, thereby enabling square wave current to flow for each phase in intervals of 120 degrees around the maximum and the minimum of instantaneous phase voltage of a three-phase power supply, and thus improving the supply power factor.

CITATION LIST

Patent Documents

Patent Document 1: Japanese Laid-Open Patent Publication No. 10-174443
Patent Document 2: Japanese Laid-Open Patent Publication No. 7-31150
Patent Document 3: Japanese Patent No. 2869498

SUMMARY OF THE INVENTION

Problems to be Solved by the Invention

In the conventional technique disclosed in Patent Document 1 described above, since the AC reactors for the respective phases are provided between the three-phase AC power supply and the full-wave rectification circuit, increase in the size of circuits and the cost is inevitable. In addition, since power supply current flows in the reactors, circuit loss increases, and therefore heat generation on the reactors caused by the loss becomes a problem.

In the conventional technique disclosed in Patent Document 2 described above, the power supply current can be made roughly into a sine wave and the supply power factor can be made to be substantially 1. On the other hand, since one pair of the single-phase rectification circuit and the step-up converter circuit needs to be provided individually for each phase of the three-phase power supply output, there is a problem that increase in the size of circuits and the cost is inevitable.

The conventional technique disclosed in Patent Document 3 described above uses a method in which the output voltage of the step-up converter and the output current of the three-phase rectification circuit are detected, a DC current instruction for suppressing the deviation between a voltage instruction and the detected voltage value to zero is generated by the DC current instruction generation circuit, a pulse signal for suppressing the deviation between the DC current instruction and the detected current value to zero is generated by the pulse signal generation circuit, and the output current of the rectification circuit is converted to DC current through ON/OFF control for the switching device of the step-up converter by using the pulse signal. Therefore, a control circuit has a double feedback loop. As a result, there is a problem that control responsiveness deteriorates and complication of the control circuit is inevitable.

The present invention has been made to solve the above problems, and an object of the present invention is to provide a power conversion apparatus that can avoid increase in the size of circuits, the cost, and the circuit loss, deterioration of the control responsiveness, and complication of the control, and can improve the input power factor of a power supply when three-phase AC power is converted to DC power.

Means of Solution to the Problems

A power conversion apparatus according to the present invention includes a three-phase rectification circuit which rectifies output voltage of a three-phase AC power supply, a step-up converter circuit which steps up output voltage of the three-phase rectification circuit, a smoothing device which smoothes output voltage of the step-up converter circuit, a voltage detection circuit which detects output voltage of the smoothing device, an AC current component detection circuit which detects an AC component of output current of the three-phase rectification circuit, and a control circuit which controls the step-up converter. The control circuit calculates a deviation $\Delta Vdc1$ ($=Vs-Vi_L-Vo_L$) among an output voltage instruction Vs for the step-up converter circuit, a detection signal $Vi_L$ from the AC current component detection circuit, and a detection signal $Vo_L$ from the voltage detection circuit, generates a pulse signal for suppressing the deviation $\Delta Vdc1$ to zero, and outputs the pulse signal to the step-up converter. The step-up converter circuit has a reactor which stores the output current of the three-phase rectification circuit and a switching device which controls charge and discharge of the current stored in the reactor in accordance with the pulse width of the pulse signal outputted from the control circuit.

Effect of the Invention

According to the power conversion apparatus of the present invention, it becomes possible to provide a power conversion apparatus that can avoid increase in the size of circuits, the cost, and the circuit loss, deterioration of the control responsiveness, and complication of the control, and can improve the input power factor of a power supply when three-phase AC power is converted to DC power.

MODE OF CARRYING OUT THE INVENTION

Embodiment 1

Figure 1:
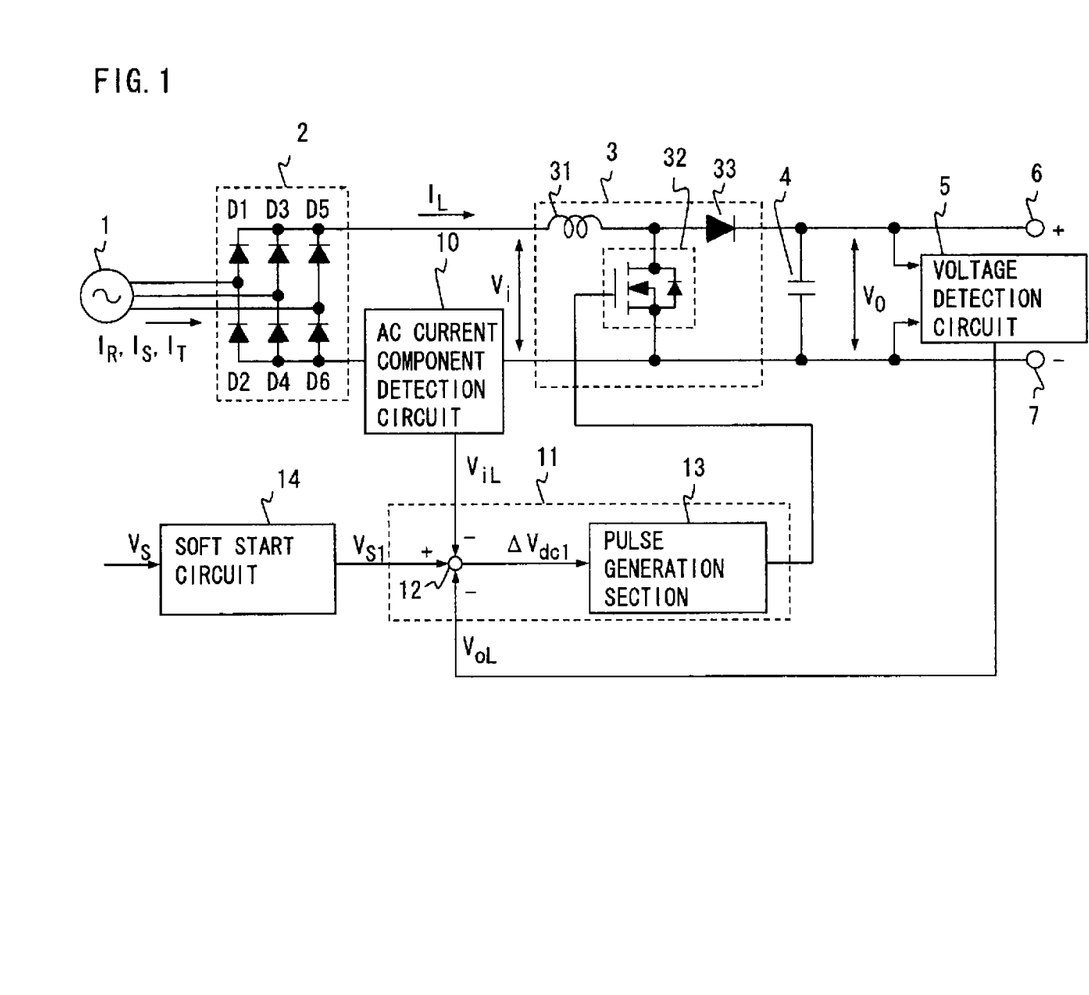
FIG. 1 is a configuration diagram of a power conversion apparatus according to embodiment 1 of the present invention.

FIG. 1 is a configuration diagram of a power conversion apparatus according to embodiment 1 of the present invention.

The power conversion apparatus according to embodiment 1 of the present invention mainly includes a three-phase rectification circuit 2, a step-up converter circuit 3, a smoothing device 4, a voltage detection circuit 5, an AC current component detection circuit 10, a control circuit 11, and a soft start circuit 14.

The three-phase rectification circuit 2 rectifies the output voltage of the three-phase AC power supply 1, and has a pair of rectification devices D1 and D2 connected in series, a pair of rectification devices D3 and D4 connected in series, and a pair of rectification devices D5 and D6 connected in series, these three pairs being connected in parallel. Each one phase of three-phase power of the three-phase AC power supply 1 is supplied to the connection point between the corresponding pair of the rectification devices connected in series. In addition, the cathode end side of each series connection of the rectification devices is commonly connected to the positive output end of the three-phase rectification circuit 2, and the anode end side is commonly connected to the negative output end of the three-phase rectification circuit 2.

The step-up converter circuit 3 steps up an output voltage Vi of the three-phase rectification circuit 2, and has a reactor 31 which stores the output current of the three-phase rectification circuit 2, a switching device (MOSFET) 32 which controls charge and discharge of the current stored in the reactor 31 in accordance with the pulse width of a pulse signal outputted from the control circuit 11, and a chopper diode 33 which prevents current flowing back from the output side.

One end of the reactor 31 and the positive output end of the three-phase rectification circuit 2 are connected to each other. In addition, the other end of the reactor 31, the drain side of the switching device 32, and the anode side of the chopper diode 33 are connected to each other. Further, the source side of the switching device 32 and the negative output end of the three-phase rectification circuit 2 are connected to each other.

Although FIG. 1 shows the configuration using a MOSFET as the switching device 32, the present invention is not limited thereto. The switching device 32 only has to be a self-turn-off semiconductor switching device. For example, an IGBT or a bipolar transistor may be employed.

The smoothing device 4 smooths the output of the step-up converter 3, and is connected between the cathode end of the chopper diode 33 of the step-up converter circuit 3 and the negative output end of the three-phase rectification circuit 2. In this case, an electrolytic capacitor with a large capacity may be used as the smoothing device 4. However, in the case where excessive surge voltage occurs between both ends of the switching device 32 when the switching device 32 performs switching operation, a configuration of connecting multiple film capacitors in parallel or a configuration of connecting both an electrolytic capacitor and a film capacitor in parallel may be employed. It is noted that the larger the capacitance of the smoothing device 4 is, the more stable its output voltage Vo becomes as DC current. Therefore, it is desirable that the smoothing device 4 should have a capacitance that can at least maintain sufficient voltage upon load variation.

The voltage detection circuit 5 is connected, in parallel with the smoothing device 4, to the output side of the step-up converter circuit 3. The voltage detection circuit 5 detects the output voltage Vo smoothed by the smoothing device 4, and outputs a detection signal $Vo_L$ corresponding to the output voltage Vo. The voltage detection circuit 5 in this case may be a circuit that directly detects the voltage between both ends of the smoothing device 4 by using a difference amplifier, an isolated amplifier, or the like, for example. However, in the case where the output voltage Vo is high, two or more resistors connected in series may be connected in parallel with the smoothing device 4, and the voltage between both ends of one of the resistors may be detected as divided voltage by a difference amplifier, an isolation amplifier, or the like.

The AC current component detection circuit 10 is provided on the output line of the three-phase rectification circuit 2. The AC current component detection circuit 10 detects an AC current component included in the output current from the three-phase rectification circuit 2, and outputs a detection signal $Vi_L$ corresponding to the AC current component. The AC current component detection circuit 10 in this case may be, for example, a circuit using a current sensor of AC type, or a circuit formed by a combination of a current sensor of DC type and a high-pass filter that removes a DC component or a combination of a current sensor of DC type and a band-pass filter that removes a DC component and a high-frequency component such as noise.

The AC current component included in the output current of the three-phase rectification circuit 2 is a current signal mainly caused by a full-wave rectification of the output of the three-phase AC power supply 1 and having a frequency six times as high as that of the three-phase AC voltage (for example, if the three-phase AC voltage is a signal of 60 Hz, the AC component is a signal of 360 Hz). Therefore, it is desirable that the above filters of the AC current component detection circuit 10 are designed to have at least a passband for a frequency six times as high as that of the three-phase AC voltage, thus obtaining the maximum effect of power factor improvement.

The control circuit 11 outputs a pulse signal processed by PWM (pulse width modulation) control based on an output voltage instruction Vs for the output voltage of the step-up converter circuit 3, the detection signal $Vo_L$ from the voltage detection circuit 5, and the detection signal $Vi_L$ from the AC current component detection circuit 10, thereby controlling the switching operation of the switching device 32 of the step-up converter circuit 3. The control circuit 11 has: a calculation section 12 which calculates a deviation $\Delta Vdc1$ ($=Vs-Vi_L-Vo_L$) among the output voltage instruction Vs for the output voltage of the step-up converter circuit 3, the detection signal $Vi_L$ from the AC current component detection circuit 10, and the detection signal $Vo_L$ from the voltage detection circuit 5; and a pulse generation section 13 which generates a pulse signal for suppressing the deviation $\Delta Vdc1$ obtained by the calculation section 12 to zero. The output of the pulse generation section 13 is connected to the gate of the switching device 32.

In this case, the output voltage instruction Vs for the output voltage of the step-up converter circuit 3 is set to be higher than the peak value of the output voltage Vi from the three-phase rectification circuit 2. Therefore, a pulse signal outputted from the control circuit 11 is always a signal directed to increase voltage.

It is noted that the soft start circuit 14 will be described later.

Next, the operation and the control method of each circuit of the power conversion apparatus having the above configuration will be described.

The three-phase output voltage of the three-phase AC power supply 1 is inputted to the three-phase rectification circuit 2, to be processed by full-wave rectification, and then the output voltage Vi of the three-phase rectification circuit 2 is inputted to the step-up converter circuit 3 at the next stage. In the step-up converter circuit 3, the output current of the three-phase rectification circuit 2 is stored in the reactor 31, charge and discharge of the current stored in the reactor 31 is controlled through switching operation of the switching device 32, stepped-up DC power is outputted to the smoothing device 4 via the chopper diode 33, and finally, the stepped-up DC output voltage Vo is outputted between a pair of output terminals 6 and 7.

Here, when the power conversion apparatus is activated from a stopped state, or when the output of the step-up converter circuit 3 rapidly changes from the state based on a low voltage instruction to the state based on a high voltage instruction, transient inrush current can flow into the smoothing device 4 via the reactor 31 and the chopper diode 33. Since the transient inrush current is larger than current in the stationary operation, devices having a rating endurable against such large inrush current need to be selected as the reactor 31, the chopper diode 33, and the switching device 32, leading to increase in the size of circuits and the cost.

Therefore, in order to suppress transient inrush current flowing in the smoothing device 4 when the power conversion apparatus is activated from a stopped state or when the state based on a low voltage instruction is rapidly changed to the state based on a high voltage instruction, here, the soft start circuit 14 is provided. The soft start circuit 14 allows the output voltage instruction Vs for the output voltage of the step-up converter circuit 3 to rise with a lag of a certain time constant. The soft start circuit 14 in this case can be formed by, as a simple example, a first-order-lag circuit composed of a resistor and a capacitor.

Thus, by using a so-called soft-start configuration, it is possible to suppress transient inrush current flowing in the smoothing device 4 when the power supply is started up or when a voltage instruction is rapidly changed, thereby preventing excessive current from flowing in the reactor 31, the switching device 32, and the chopper diode 33. It is noted that an output signal Vs1 of the soft start circuit 14 is set so as to finally become equal to Vs (output voltage instruction). Thus, it becomes possible to select devices having an appropriate current rating as the reactor 31, the switching device 32, and the chopper diode 33, thereby avoiding increase in the size of the circuit and the cost, and heat generation of devices. As a result, a small-sized power conversion apparatus with low cost can be realized. It is noted that if there is no possibility of transient inrush current flowing in the smoothing device 4, the soft start circuit 14 may be omitted.

The calculation section 12 of the control circuit 11 calculates the deviation $\Delta Vdc1$ ($=Vs-Vi_L-Vo_L$) based on the output voltage instruction Vs given from the outside for the output voltage of the step-up converter circuit 3, the detection signal $Vo_L$ from the voltage detection circuit 5, and the detection signal $Vi_L$ from the AC current component detection circuit 10, and outputs the calculated value to the pulse generation section 13 at the next stage. The pulse generation section 13 generates a pulse signal for suppressing the deviation $\Delta Vdc1$ obtained by the calculation section 12 to zero.

Figure 2:
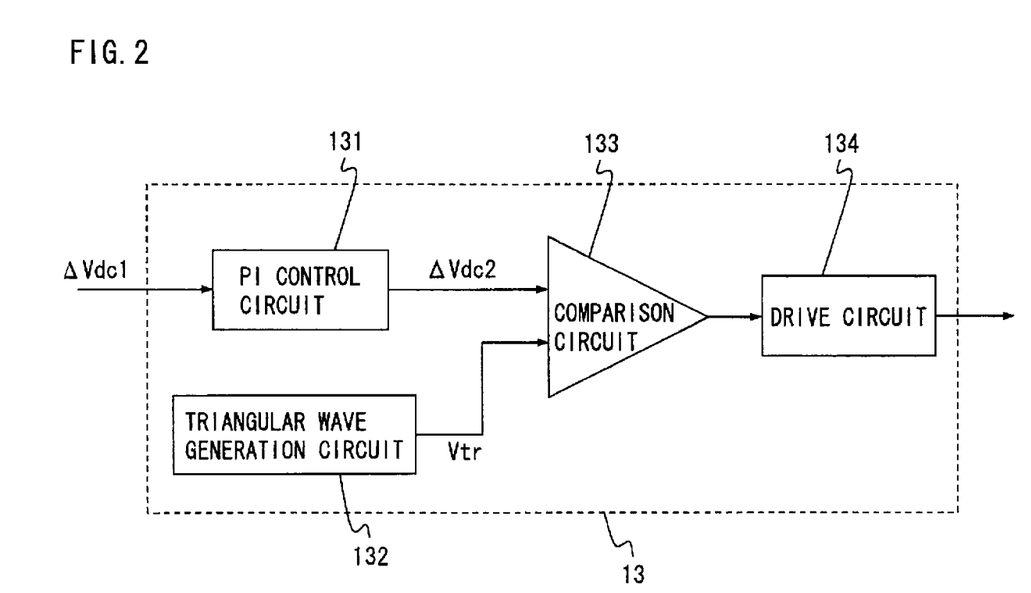
FIG. 2 is a configuration diagram showing the details of a pulse generation section included in a control circuit of the power conversion apparatus according to embodiment 1 of the present invention.

That is, the pulse generation section 13 has: for example, as shown in FIG. 2, a PI control circuit 131 which performs proportional integral (PI) control based on the deviation $\Delta Vdc1$ calculated by the calculation section 12; a triangular wave generation circuit 132 which generates a triangular wave signal Vtr having a predetermined frequency; a comparison circuit 133 which compares an output signal $\Delta Vdc2$ of the PI control circuit 131 with the triangular wave signal Vtr of the triangular wave generation circuit 132; and a drive circuit 134 which performs ON/OFF control for the switching device 32 in accordance with the output of the comparison circuit 133.

The comparison circuit 133 compares the output signal $\Delta Vdc2$ from the PI control circuit 131 with the triangular wave signal Vtr from the triangular wave generation circuit 132. At this time, if the output signal $\Delta Vdc2$ is larger than the triangular wave signal Vtr, the comparison circuit 133 outputs a pulse signal to turn on the switching device 32, and if the output signal $\Delta Vdc2$ is smaller than the triangular wave signal Vtr, the comparison circuit 133 outputs a pulse signal to turn off the switching device 32. Based on the pulse signal from the comparison circuit 133, the drive circuit 134 drives the gate of the switching device 32, thereby performing ON/OFF control for the switching device 32.

It is desirable that the signal frequency of the triangular wave generation circuit 132 should be set to be higher than the frequency of the three-phase AC power supply 1 such that ON/OFF operation of the switching device 32 can be performed sufficient number of times within ⅙ period (the interval between the peak values of the three-phase pulsating current) of the frequency of the three-phase AC power supply. By thus setting the frequency to be high, it becomes possible to obtain still greater effects of stabilizing the converter output voltage and improving the power factor.

Thus, the control circuit 11 performs ON/OFF control, that is, PWM (pulse width modulation) control for the switching device 32 of the step-up converter 3 in accordance with the deviation ΔVdc1 (=Vs−Vi$_L$−Vo$_L$) among the output voltage instruction Vs from the outside, the detection output Vo$_L$ of the voltage detection circuit 5, and the detection output Vi$_L$ of the AC current component detection circuit 10.

Figure 3:
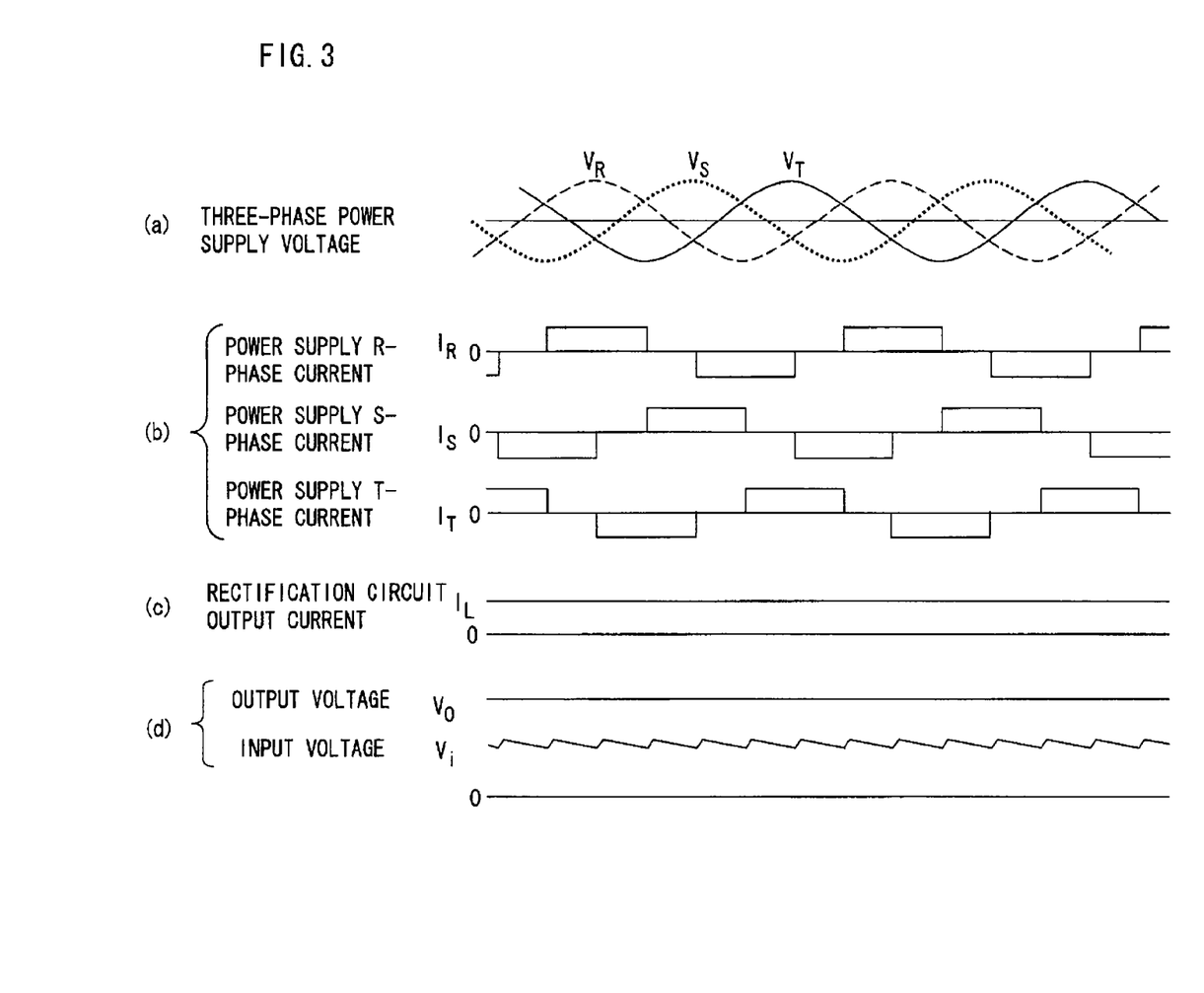
FIG. 3 is a characteristics diagram showing the voltage and current of each section of the power conversion apparatus according to embodiment 1 of the present invention.

Here, in the case where control is performed without introducing the detection signal Vi$_L$ of the AC current component detection circuit 10 into the control circuit 11, current composed of DC current and ripple current superimposed thereon and having a frequency six times as high as that of the three-phase AC power supply 1, flows as the output current of the three-phase rectification circuit 2. On the other hand, in embodiment 1, by introducing the detection signal Vi$_L$ of the AC current component detection circuit 10 into the control circuit 11, ripple current is included in the deviation ΔVdc1 calculated by the calculation section 12, and the deviation ΔVdc1 including the ripple current is inputted to the pulse generation section 13 at the next stage. Therefore, the step-up converter 3 is controlled so as to suppress the deviation ΔVdc1 including the ripple current to zero. As a result, as shown in FIG. 3, DC output current I$_L$ that has been stabilized flows on the output side of the three-phase rectification circuit 2 (see FIG. 3(c)), and the output voltage Vo of the power conversion apparatus becomes constant (see FIG. 3(d)).

In addition, at this time, the DC current I$_L$ of the three-phase rectification circuit 2 flows between two phases of the maximum one and the minimum one of the power supply voltages of the three-phase AC power supply 1. Therefore, power supply currents I$_R$/I$_S$, and I$_T$ for the respective phases (that is, current flowing from the three-phase AC power supply 1 into the three-phase rectification circuit 2) become 120-degree square wave currents having an amplitude I$_L$ and a phase lag of 120 degrees thereamong (see FIG. 3(b)).

Thus, in the case where the 120-degree square wave current flows as the power supply current, an input power factor cos θ of the power supply is shown by the following expression (1).

[Expression 1]

$$\cos\theta = \frac{\text{EFFECTIVE POWER}}{\text{APPARENT POWER}} = \frac{P_a}{E \times I} \quad (1)$$

Here, E is the effective value of the power supply voltage, I is the effective value of the square wave current including a harmonic component, and Pa is the effective power.

In addition, the effective value I of the 120-degree square wave current is shown by the following expression (2).

[Expression 2]

$$I = \sqrt{\frac{1}{\pi}\int_0^{\frac{2}{3}\pi} I_L^2\, dt} = 0.816 \times I_L \quad (2)$$

Here, since instantaneous supply power voltage is Vi=(√2)·E·sin θ and instantaneous power supply current is I$_L$ (π/6≤θ≤5π/6, 7π/6≤θ≤5π/6), the effective power is shown by the following expression (3).

[Expression 3]

$$P_a = \frac{1}{\pi}\int_{\frac{1}{6}\pi}^{\frac{5}{6}\pi} \sqrt{2}\, E\sin\theta \cdot I_L\, d\theta = \frac{\sqrt{6}}{\pi} EI_L \quad (3)$$

Therefore, by substituting expression (2) and expression (3) into expression (1), the input power factor of the power supply is calculated as cos θ≈0.956, thus obtaining the effect of improving the power factor.

As described above, the power conversion apparatus of embodiment 1 controls the step-up converter circuit 3 by using the control circuit 11 such that stabilized DC current flows on the output side of the three-phase rectification circuit 2, thereby causing 120-degree square wave current to flow from the three-phase AC power supply 1. Therefore, it is not necessary to provide an AC reactor individually for each phase between the AC power supply and the full-wave rectification circuit as shown in the conventional technique (Patent Document 2). Therefore, while avoiding increase in the size of circuits, the cost, and the circuit loss, it becomes possible to increase the response speed of control and improve the supply power factor to about 0.95 with a simple configuration.

In addition, even in the case of three-phase power reception, a power conversion apparatus can be formed by providing a single three-phase rectification circuit 2 and a single step-up converter circuit 3. Therefore, while avoiding complication of circuits and increase in the size of circuits, the cost, and the circuit loss, it becomes possible to greatly increase the supply power factor to about 0.95 with a simple circuit configuration, and to step up and control the output voltage to be constant voltage.

Further, unlike the configuration that the control circuit has a double feedback loop as shown in the conventional technique (Patent Document 3), the power conversion apparatus of embodiment 1 has the control circuit 11 which generates a pulse signal for suppressing, to zero, the deviation ΔVdc1 (=Vs−Vi$_L$−Vo$_L$) among the output voltage instruction Vs for the output voltage of the step-up converter circuit 3, the detection signal Vi$_L$ of the AC current component detection circuit 10, and the detection signal Vo$_L$ of the voltage detection circuit 5, thus forming a single feedback loop. As a result, it becomes possible to avoid complication of the control circuit 11 and increase the speed of control response. Therefore, a power conversion apparatus with high output stability can be formed by a simple method.

Embodiment 2

Figure 4:
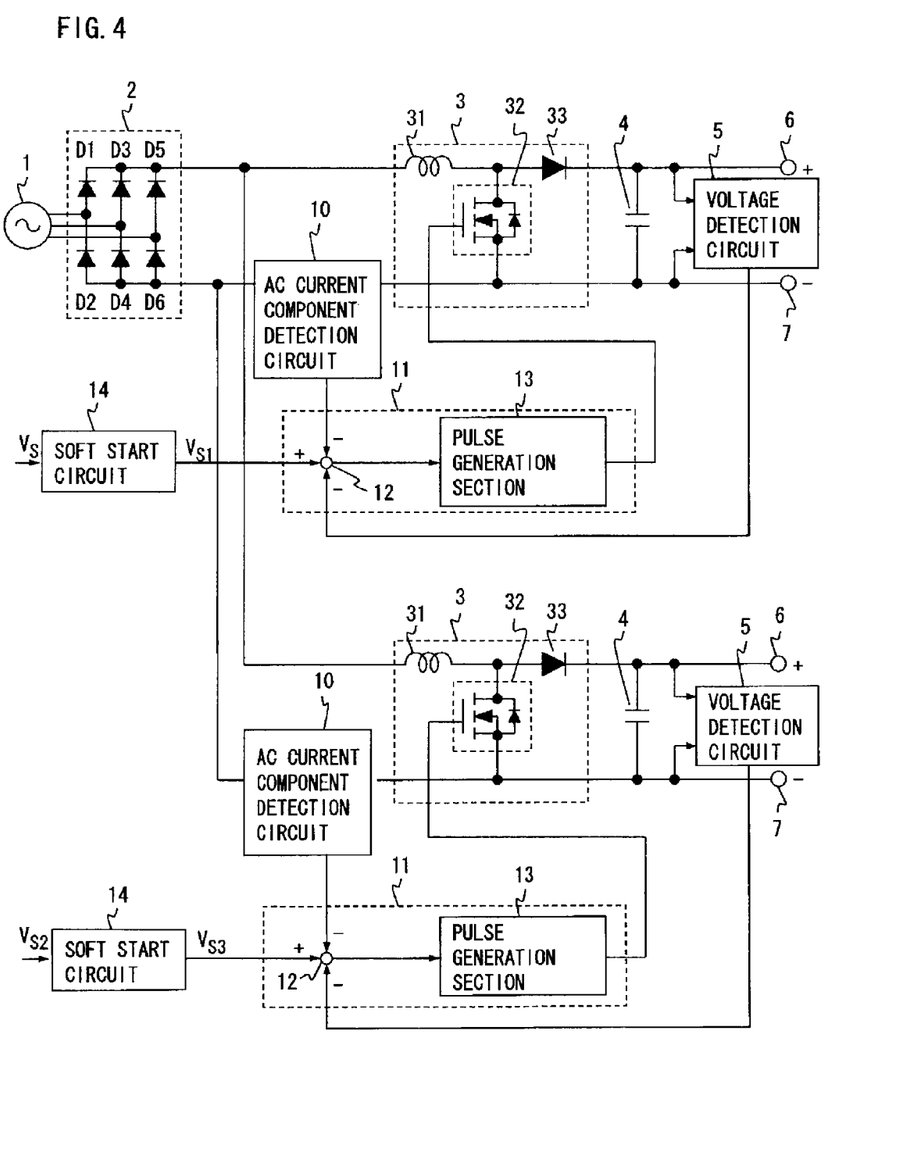
FIG. 4 is a configuration diagram of a power conversion apparatus according to embodiment 2 of the present invention.

FIG. 4 is a configuration diagram of a power conversion apparatus according to embodiment 2 of the present invention. Constituent components that correspond to or are the same as those of embodiment 1 shown in FIG. 1 are denoted by the same reference numerals.

In the above embodiment 1, one pair of the step-up converter circuit 3 and the smoothing device 4 is connected after the three-phase rectification circuit 2. On the other hand, if a plurality of DC outputs are needed, as shown in FIG. 4, a plurality of pairs of the step-up converter circuits 3 and the smoothing devices 4 may be connected after the three-phase rectification circuit 2.

Here, if the same output voltage Vo is desired to be obtained among the step-up converter circuits 3, the voltages Vs having the same value are given as output voltage instructions for the output voltages of the step-up converter circuits 3. On the other hand, if different output voltages are desired to be obtained, voltages Vs and Vs2 (Vs≠Vs2) having different values can be given as output voltage instructions for the output voltages of the step-up converter circuits 3.

In either case, 120-degree square wave current can be caused to flow from the three-phase AC power supply 1 by controlling each step-up converter circuit 3 such that DC current flows on the output side of the three-phase rectification circuit 2. Therefore, as in embodiment 1, the overall power factor of the power supply can be greatly increased to about 0.95, and the output voltage Vo can be stepped up and controlled to be constant voltage. Thus, a power conversion apparatus having an improved power supply factor can be formed with a simple configuration while avoiding increase in the size of circuits and the cost.

The invention claimed is:

1. A power conversion apparatus which converts power from a three-phase AC power supply to DC power, the power conversion apparatus comprising:
    a three-phase rectification circuit which rectifies an output voltage of the three-phase AC power supply;
    a step-up converter circuit which steps up the output voltage of the three-phase rectification circuit;
    a smoothing device which smoothes an output voltage of the step-up converter circuit;
    a voltage detection circuit which detects an output voltage of the smoothing device;
    an AC current component detection circuit which detects an AC current component in which ripple current of an output current of the three-phase rectification circuit is superimposed;
    a control circuit which has a calculation section and a pulse generation section for controlling the step-up converter; and
    a single feedback control loop formed by the voltage detection circuit, the calculation section, and the pulse generation section, wherein
    the calculation section calculates a value obtained by subtracting a detection signal of the AC current component detection circuit and a detection signal of the voltage detection circuit from an output voltage instruction for the step-up converter circuit as a deviation,
    the pulse generation section having a single proportional integral (PI) control circuit generates a pulse signal for suppressing the deviation to zero,
    the control circuit outputs the pulse signal to the step-up converter, and
    the step-up converter circuit includes: a reactor which stores the output current of the three-phase rectification circuit; and a switching device which controls a charge and discharge of the output current stored in the reactor in accordance with a pulse width of the pulse signal outputted from the control circuit.

2. The power conversion apparatus according to claim 1, wherein
    the calculation section calculates the deviation $\Delta Vdc1$ ($=Vs-Vi_L-Vo_L$) based on the output voltage instruction Vs for the step-up converter circuit, the detection signal $Vi_L$ from the AC current component detection circuit, and the detection signal $Vo_L$ from the voltage detection circuit; and
    the pulse generation section generates the pulse signal for suppressing the deviation $\Delta Vdc1$ obtained by the calculation section to zero.

3. The power conversion apparatus according to claim 2, wherein
    the pulse generation section includes: the PI control circuit which performs proportional integral control by using the deviation $\Delta Vdc1$ calculated by the calculation section; a triangular wave generation circuit which generates a triangular wave signal having a predetermined frequency; a comparison circuit which compares an output signal of the PI control circuit with the triangular wave signal from the triangular wave generation circuit; and a drive circuit which performs ON/OFF control for the switching device in accordance with output of the comparison circuit, and
    the signal frequency of the triangular wave generation circuit is set to be higher than the frequency of the three-phase AC power supply.

4. The power conversion apparatus according to claim 2, further comprising a soft start circuit which gradually increases the output voltage instruction value Vs for the step-up converter circuit, wherein
    the calculation section of the control circuit calculates the deviation $\Delta Vdc1$ ($=Vs1-Vi_L-Vo_L$) based on an output signal Vs1 of the soft start circuit, the detection signal $Vi_L$ from the AC current component detection circuit, and the detection signal $Vo_L$ from the voltage detection circuit.

5. The power conversion apparatus according to claim 1, wherein
    the AC current component detection circuit includes a filter having a passband for a frequency six times as high as that of the three-phase AC power supply.

6. The power conversion apparatus according to claim 1, wherein
    a plurality of groups each including the step-up converter circuit, the smoothing device, the voltage detection circuit, the AC current component detection circuit, and the control circuit are provided in parallel for the three-phase rectification circuit.

* * * * *